United States Patent [19]

Tock

[11] Patent Number: 4,818,604
[45] Date of Patent: Apr. 4, 1989

[54] COMPOSITE BOARD AND METHOD

[75] Inventor: Richard W. Tock, Lubbock, Tex.

[73] Assignee: Sub-Tank Renewal Systems, Inc., San Angelo, Tex.

[21] Appl. No.: 32,049

[22] Filed: Mar. 27, 1987

[51] Int. Cl.$^4$ .............................................. B32B 27/00
[52] U.S. Cl. .................................. 428/319.9; 428/326; 428/443; 428/445; 428/507
[58] Field of Search .................... 524/14, 15, 34; 428/445, 443, 319.1, 319.9, 326, 507

[56] References Cited

U.S. PATENT DOCUMENTS

| | | | |
|---|---|---|---|
| 2,718,479 | 9/1955 | Bierly | 428/445 |
| 4,209,561 | 6/1980 | Sawko | 524/14 |

FOREIGN PATENT DOCUMENTS

| | | | |
|---|---|---|---|
| 0189236 | 11/1983 | Japan | 524/15 |
| 0012808 | 1/1984 | Japan | 524/15 |
| 0196369 | 11/1984 | Japan | 524/15 |

OTHER PUBLICATIONS

Tock, Simms and Irvine, "Organic Filler and Resins Make Better Chemistry", Plastics Engineering, Dec. 1986, pp. 27-30.

Primary Examiner—Marion C. McCamish
Attorney, Agent, or Firm—Shlesinger, Arkwright & Garvey

[57] ABSTRACT

A composite board is produced by the method of blending a cellulosic filler having sufficient extractable organic content and an expandable thermoplastic polymer, adding a tacifier agent during blending for producing a pre-blown mixture, heating the mixture in a mold to a temperature above the glass transition temperature of the polymer for a period of time sufficient to permit expansion of the beads and bonding of the expanded beads with the cellulosic filler to thereby form a composite board. The board may be laminated by a solvent based adhesive or a thermal insult coating so as to form rigid macro-voids between the laminate and the composite board surface.

28 Claims, 1 Drawing Sheet

COMPOSITE BOARD AND METHOD

BACKGROUND AND FIELD OF THE INVENTION

The present invention relates to a synthetic composite board product for use in the building and construction industry. Synthetic prefabricated boards frequently have strength, density, acoustic and fire resistant characteristics unavailable with conventional forest products. More recently, the ever dwindling supply of natural resources has made synthetic composite boards a cost effective alternative to conventional wood boards.

Various attempts in the prior art have been made to fabricate a composite panel embodying such characteristics as low density, improved isotropic mechanical properties, greater resistance to moisture and improved thermal and acoustical insulation qualities. Nevertheless, it has been customary to sacrifice strength to obtain low density or to sacrifice low density to obtain maximum strength.

Composite board structures have been prepared by combining synthetic resins with cellulosic waste material, such as wood shavings, paper scraps, sawdust, etc. Examples of these prior art devices are U.S. Pat. Nos. 3,598,672 to Heller, 2,951,057 to Weise, 4,324,831 to Parrini, 4,468,336 to Smith and 4,528,037 to Guidat. U.S. Pat. No. 3,598,672 discloses an insulation composition comprising textile fibers in conjunction with solid polystyrene which is subjected to high pressure in a mold. The binder may be an epoxy or polyester resin. U.S. Pat. No. 3,510,323 discloses the use of a silane ingredient to function as a binder for sawdust in an insulator material. U.S. Pat. No. 4,324,831 discloses a prefabricated panel combining wood chips and polystyrene. U.S. Pat. No. 4,528,037 discloses a thermal and acoustic insulation material which includes a lignocellulose material in combination with an alkali metal silicate solution. U.S. Pat. No. 2,806,509 to Bozzacco discloses a sandwich structure composed of polystyrene and silicone resin which yields individual, adjacently disposed beads for added strength after molding.

All of the aforementioned prior art composite boards either combine cellulosic filler material with a polymer or inorganic fillers, such as asbestos, various clays, calcium carbonate and the like, with foamable resins. None of the prior art patents disclose composite board product having sufficient interfacial bonding between the polymer and the filler to yield a composite board which exhibits relatively low density and increased mechanical strength. Furthermore, composite boards consisting of conventional cellulosic filler and foamed polymer lack resistance to thermal and solvent attack during lamination. The inability of the prior art boards to accept resinous laminates significantly reduces their utility in the industry.

OBJECTS AND SUMMARY OF THE INVENTION

The primary object of the disclosed invention to provide a composite board having low density but increased mechanical and impact strength as compared with prior art composite boards.

It is another object of this invention to provide a composite board which may laminated yet resist solvent and thermal attack.

A further object of this invention is to provide a composite board having improved resistance to moisture and mildew.

Yet another object of this invention is to provide a composite board which is both economical and cost effective to manufacture.

Still a further object of this invention is to provide a composite board having increased acoustical insulation properties.

Another object of this invention is to provide a composite board utilizing flakes, fibers and granular cellulosic material to provide a bridging structure between adjacent foamed beads and filler material in the open voids formed therein.

Still another object of the present invention is to provide asynthetic composition which is readily moldable into a variety of shapes and sizes adaptable for building purposes.

These and other objects of this invention will become apparent from the following description and claims.

DESCRIPTION OF THE DRAWINGS

In the accompanying drawings which illustrate by way of example the embodiment of this invention.

DETAILED DESCRIPTION OF THE PREFERRED EMBODIMENT

Figure 1:
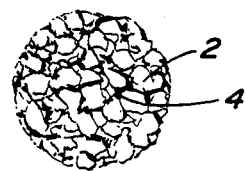
FIG. 1 is a cross-sectional view of the pre-blown mixture of filler and polymer.

The present invention is directed to a new composite filled foam board comprising of an expandable thermoplastic foam and a cellulosic filler material. Additionally, a surface-active ingredient is added to the pre-blow mix to aid in dispersion of the resin during the blending step, as well as to promote adhesive bonding between the filler and the thermoplastic resin during molding. Each of the above mentioned components possesses properties which maximize the performance of the final composite board.

THERMOPLASTIC FOAM

The thermoplastic foam component of the invention covers a broad range of polymers which are capable of being expanded by thermal means. When the polymer expands during the board manufacturing process, it creates a region of closed-cell microstructure. This closed-cell microstructure contributes the following characteristics to the final board product: (1) improved mechanical resilience, (2) improved thermal insulation, (3) inhibition of gross sorption and retention of liquids (sponge effect), and (4) significant density reduction. As with any thermoplastic foam, the more uniform the microcellular structure then the better the performance.

The present invention particularly contemplates the use of thermoplastic polystyrene foam (EPS). EPS is both commercially available in bead form, and is capable of being thermally expanded. Any other granular thermoplastic, containing a thermally activated blowing agent can also be used. It is important that the beads, whatever the composition, have sufficient blowing agent content for densities of 1–3 $lb_m/ft_3$ by traditional prepuff expansion technology to be achieved. Any of the hard, glassy, vinyl polymers, which may be polymerized by a suspension process, are contemplated in the present invention. Examples of these include polystyrene, poly (methyl methacrylate), poly (vinyl chloride), poly (vinylidene chloride) and polyacrylonitrile.

It should be noted that thermoset resins are not appropriate because these materials begin as low-viscosity liquids and often lead to open-celled structures which are rather friable. Those characteristics are undesirable for the present invention.

The EPS beads may be of any size distribution commercially available, including off-specification bead sizes, thereby further reducing raw material costs.

FILLER COMPONENT

The filler material, which is combined with the polystyrene beads, is, in its broadest sense, a lignocellulose-based material. The preferred filler material for the present invention is a waste by-product of the cotton ginning industry, although sawdust, shredded paper, ground corn cobs and milo stubble may be used. The preferred by-product waste includes leaves, stems, seeds, trunk portions, sticks and burrs, all of which have been removed from the cotton fiber of the plant. This agriwaste is cleaned and processed to provide distribution of physical shapes, including flakes, fibers and granular geometries.

A satisfactory lignocellulose filler is marketed by Sunbelt America of Littlefield, Tex. under the designations HPD/10 through HPD/30. The numerical designations refer to the screen size through which the material has been classified. Optimum board structure results from a mixture of 20 parts by weight HPD/30 with 80 parts by weight HPD/16. Although size distribution of the filler is not critical, better boards are produced by including this broad range of particle sizes and shapes.

The superiority of cotton gin by-product waste becomes apparent when its natural distribution of fibers, flakes and granules is compared with the relatively uniform size distribution of other cellulosic fillers, such as sawdust or shredded paper. The flakes and fibers of cotton gin by-product waste provide an improved "bridging effect" or "bridging structure" between the localized foam polymeric bead structures. The granular material helps to fill the interstitial voids between the polymer beads prior to expansion.

Most importantly, the present invention requires a lignocellulose filler material having a high level of extractable organic content. Cotton gin by-product waste has been found to be superior to other lignocellulose fillers in this regard. Cotton gin by-product waste contains low amounts of cellulose and high amounts of lignin, as compared to the other lignocellulosic fillers. Also, the filler contains an atypically high level of ash. It has been established that lignin plays a more dominant role in polymer filler interaction than does cellulose fibre, hence a high lignin content is desirable when choosing a filler for use in the present invention.

Lignin is derived from substituted aromatics, such trans-coniferyl, trans-sinapyl and trans-p-coumaryl alcohols. A high lignin content is desired because its amorphous structure is capable of being cross-linked much like phenolic, epoxy and polyester resins. Cross-linkage is useful for increasing heat stability or bonding of resins or fillers. Conversely, cellulose is a saturated polysaccharide ring structure with a molecular weight approaching one million. It tends to be crystalline and linear. A carbohydrate, it is subject to dehydration and instability (degradation) at elevated temperatures and thus is undesirable as a filler component. Lastly, a high ash content (inorganic silicates) will effectively reduce the fraction of cellulose and its attendant lower heat stability thereby improving tensile and flexural strength of the finished board product. Thus, the chemical differences in the extractable organics between various fillers is believed to be what causes one filler to be superior to another.

The above mentioned cotton gin by-product filler is distinctively different and better than those derived from wood alone. Analysis has shown that cotton gin by-product waste has around three times the extractables (70%), three times the lignin (45%), about half the hollocellulose and thirty times (11.5%) the ash content of wood. The difference in composition is due to differences in the plant species (for example, wood versus cotton) and to the actual part of the plant harvested for grinding into filler—trunk, stem and leaf. The above data is taken from "Organic Filler and Resins Make Better Chemistry", R. W. Tock, T. Simms and R. Irvine, Plastics Engineering, December 1986 and is incorporated herein by reference.

Physical size and shape alone are not all that is required of the cellulose filler. The extractable organic content is the determining characteristic of the filler component. The disclosed filler is better suited to plastics than its low-ash, high-cellulose counterparts, and it is just as cost effective. Any cellulose filler meeting the above requirements is contemplated within the present invention.

Gin by-product waste contains 70% of extractable organics. The extractable organic compounds plasticize the surface of the polystyrene beads as they foam, and thereby increase adhesive bonding at relatively low densities between the bead and the fiber. This resultant adhesive bond provides good stability against water or solvent absorption after the board is formed. It also contributes to the good stress transfer and mechanical performance of the resultant board.

If fire retardancy is required in the final product, then the filler and the polymer beads should be modified with flame retardants. Application of an ammonium phosphate water solution (6–10% by weight added) has been found to be an effective fire retardancy agent. However, the present invention is not limited thereto and any of the conventional fire retardant agents known in the art are applicable in the present invention.

SURFACE ACTIVE AGENT

A surface active agent (SAA) is initially added to the polymer beads and the filler material as a processing aid. In the initial stages of dry blending the polymer beads with the filler material, the SAA tends to aid in promoting a uniform dispersion between the constituents. In the latter stages of processing, during molding, the SAA promotes interfacial adhesive bonding between the filler and the polymer. This two fold processing characteristic is critical to the present invention. Water, detergents and mineral oils can initially serve to promote dispersion of the mixture, but completely fail to promote adhesive bonding in the latter stages of the processing. On the other hand, good organic solvents, which may promote adhesive bonding, tend to destroy the polymer bead structure and release the gaseous blowing agents, thereby resulting in inadequate foaming.

The use of a silane polyester has been found to meet the parameters set out above. An appropriate silane polyester is available from Union Carbide, under the designation A-131. Hercules Pamak 1771 is also suitable as the surface active agent. Further, the use of polyglycols has been found adequate for the present invention. Polyethylene glycol and polypropylene glycol are available from Dow Chemicals under the designation polyglycol ½-2 and 15-200.

The surface active agent comprises about 1% part by weight of the total polystyrene bead content in the invention. Although board may be produced without using the SAA, superior board properties are achieved when using the surface active agent in the proper amount. The dry blending and adhesion promoting properties during bead expansion make the SAA a required component of the present invention.

MANUFACTURING PROCESS

Production of the board begins with preprocess blending of the filler material and the polymer beads. The filler material is added first, then the polystyrene beads, followed by the surface active agent. In the preferred embodiment, the total filler content comprises 20 parts by weight HPD/30 and 80 parts by weight HPD/16. The relative proportions of filler size can be varied beyond this ratio to produce differing board characteristics. The total filler content is from between about 1 part by weight to about 60 parts by weight. The preferred range is 50 parts by weight.

The polymeric beads comprise from about 40 parts by weight to about 90 parts by weight of the total composition. In the preferred embodiment, the beads comprise 50 parts by weight of the total mixture. The remaining key ingredient is the surface active agent. It is added to the mixture at 1-2 parts by weight of the total polymer bead weight content.

An example of the relative proportions is outlined in Table I with relative proportions given as parts by weight.

TABLE I

| | |
|---|---|
| HPD/16 | 80 parts (by weight) |
| HPD/30 | 20 parts |
| EPS beads | 100 parts |
| Tacifier | 1-2 parts |

Blending should take place in a ribbon blender or a similar agitated mixing device. The blending time should be sufficient to achieve an homogenous mixture. This point is usually reached when the dust and particulate material has settled out of the mixer air space. Beads and filler can be mixed and held in the blender for several hours without any pronounced deleterous effects occurring during the board molding process. The mixture should not be held beyond eight (8) hours, as the homogenity of the mixture deteriorates soon thereafter.

After the board components have been properly dry blended to a uniform dispersion, the mixture is placed into a mold shaped to the size of the desired board product. The amount needed for the desired board density is weighed out on an industrial balance. For example, a 4 ft by 8 ft by 1" board, having a density of 12 pcf requires 32 pounds of mixture. This mass of material is evenly distributed into the mold cavity, leveled and lightly compacted with a bar tool to vent air. Care must be taken to see that that a uniform thickness of the mixture is dispersed throughout the mold. This is particularly important for edge and corner regions if the formed board is not to be later trimmed. When the mixture is level and lightly compacted, the top of the mold is placed over the material and it is stacked prior to the run.

Because of the heat transfer resistance which build as the beads begin to expand along the mold surface, the board manufacturing process is limited to a thickness of between ¼" to 2". Larger thicknesses have high instances of unexpanded beads in the core region. Thinner boards, below ¼" to ⅜", suffer from inhomogenities.

The sheet molds used to produce the composite board are externally heated. The mold surface temperature must reach levels that are 10° to 20° above the glass transition temperature (Tg) of the thermoplastic polymer. For polystyrene, Tg is 200°-210° F. (100° C.). Of course, the Tg will vary depending upon the particular polymer used. Higher temperatures may hasten the onset of expansion, but shorten the time before the onset of foam collapse. Hence, the polymer melt temperature should not be exceeded. A minimum of 20 minutes and a maximum of 45 minutes are required for complete expansion of the polymer. Usually, 15 minutes are required for the foaming process to reach the maximum of expansion. After the foam has been sufficiently expanded, the mold is cooled by external means, such as by circulating a coolant. The cooling or curing phase generally requires 5 to 15 minutes. When water is the coolant, cooling is sufficient when the exiting water is within 10° F. of the inlet water. Various coolant arrangements are known in the art and this particular embodiment is not intended to be limiting thereto.

The heating and cooling cycles are primarily functions of the mold size and temperature required. Tables 2 and 3 provide equations for calculating the heating and cooling time periods.

TABLE 2

Time required for heating cycle of the board product

Assumptions:
1. Steel molds are used of mass, $m_s$.
2. A hot-air forced convection oven is used for heating. A constant temperature, $t_s$, can be maintained $\pm 5°$ F. throughout the heating cycle.
3. The convective heat transfer resistance controls. A convective heat transfer coefficient, h, and an effective heat transfer area, A, are known.
4. A mass, $m_p$, of EPS beads and HPD are placed into the mold.
5. Softened EPS at 220° F. requires at least 15 minutes to expand.

Solution: Perform an unsteady-state energy balance on the mold and its contents once it is placed in the oven.

$$(m_s C_s + m_p C_p) \frac{dT}{dt} = hA(t_s - T) \quad (1)$$

Thermal energy adsorbed by the mold and contents=-
Thermal energy transferred by convention The equation (1) can be integrated and solved for the appropriate conditions:
1. At $t=0$, the temperature of the mold and its contents are ambient, $T_o$.
2. At $t=t'$, the temperature of the mold and its contents has reached a temperature which is 10° F. above the $T_g$ of the polymer (i.e., foam expansion can occur, $T_1$).

With this set of boundary conditions, Equation (1) is solved for $t'$.

$$t' = \ln \frac{(t_s - T_o)}{(t_s - T_1)} / \left( \frac{hA}{mC} \right) \quad (2)$$

The total heating time for formation of the FPF board, therefore, is the sum of t' in minutes plus the 15 minutes required by rheological parameters for blowing the foam.

TABLE 3

Time required for the cooling cycle of the board product

Assumptions:
1. The time for switching from a heating environment to a cooling environment is negligible.
2. If cooling by air is employed, then the air is a constant 60° F. If cooling by water, the water is a constant 60° F.
3. The convective heat transfer coefficient controls. As with air heating, h=5.0. With water cooling, h=500.0.
4. All other physical parameters, masses, areas, etc. are the same as during the heating cycle.
5. The board, when cooled to 180° F., is sufficiently below the $T_g$ of polystyrene that further foam expansion and deformation does not occur.

Solution: As in Table 2, an unsteady-state energy balance is performed on the mold taken from the oven for cooling. Equation which results from the energy balance is solved for the appropriate boundary conditions.

$$t_c' = \ln \frac{(T_o - t_s)}{(T_1 - t_s)} / \left( \frac{hA}{mC} \right) \quad (3)$$

In Equation (3), the variables are defined as follows:
$t_c'$ = cooling time in minutes
$T_o$ = 225° F. initial temperature of mold and contents on removal from the oven
$T_1$ = 180° F. = (Tg−25° F.)
$t_s$ = air temperature, 60° F., constant
h = heat transfer coefficient, 5.0 or 50.0
A and (mC) are the same as in the heating cycle Equation (1)

Since the process begins with unexpanded beads, the molding process takes longer than the traditional block molding with prepuffed beads. Also, the internal pressure in the mold cavity increases substantially. This pressure aids in creating good bead-to-filler adhesion, but it must also be taken into account in the mold design. A relatively large four ft by eight ft sheet mold can be quickly warped by internal pressure if the mold is left unconfined or poorly braced. The internal pressure created by the expanding board product is a function of the final board density. For example, a 10 pound per cubic foot board exerts less internal pressure than a 30 pound per cubic foot board. Table 4 indicates how the internal mold pressure can be calculated for mold design purposes of the present invention.

TABLE 4

Mold design: internal pressures

Assumptions:
1. EPS contains 7.0 weight percent blowing agent.
2. Peak temperature reached is 270° F.
3. All the n-pentane (blowing agent) expands as an ideal gas and reaches the peak oven temperature. Note, this is the worst case since n-pentane has a compressibility factor of less than unity.

Solution: The pressure exerted inside the mold cavity is calculated from the ideal gas law.

$$P = nRT/V_o \quad (4)$$

In Equation (4) the variables have the following significance:
P = presure in psi
n = pound moles of n-pentane
R = the gas constant (10.73)
T = the absolute temperature °R
$V_o$ = the free gas volume in the mold (ft$^3$)

The variable, n, the number of pound moles of n-pentane, is calculated from the volume of the mold, the density of the FPF board needed, and the weight percent of EPS in the FPF board. Similarly, the free gas volume in the mold is found by subtracting the volumes of the EPS and HPD in the mold from the total mold volume.

After cooling in the mold for the required period, the mold is disassembled, the board is removed and a new run is begun.

PHYSICAL PROPERTIES

The board produced as described above has a number of desirable and unique characteristics unknown in the prior art.

The board can be made with a wide range of densities from 5 lb/ft$^3$ (balsa wood) up to 60 lb/ft$^3$.

The board yields isotropic macroscopic physical properties. Wood has a grain and even plywood or chip boards have anistropric properties in at least one direction. The overall strength of the board produced by the present invention is superior.

The composite board also has better physical properties in compression and impact than does the conventional foam board of the same density. The mixture of cellulosic filler with the polymer in the present invention makes the present board more cost effective. Finally, by using modified grades of polystyrene beads, the flammability of the new board is significantly reduced.

The above outlined physical properties of the present invention are compared to balsa wood, structural insulating board and medium density hard board in Table 5.

TABLE 5

| | PHYSICAL PROPERTY DATA COMPARISONS [Material Designation] | | | |
| --- | --- | --- | --- | --- |
| Property Characteristic | Filler Plus Foam Board 50% Filler | Balsa Wood | Structural Insulating Board | Medium Density Hardboard |
| Free Moisture | 6% | 11% | — | — |
| Specific Gravity | 0.24 | 0.15 | 0.16–0.42 | 0.53–0.80 |
| Density (pcf) | 15 | 10 | 10–30 | 33–50 |

TABLE 5-continued
PHYSICAL PROPERTY DATA COMPARISONS
[Material Designation]

| Property Characteristic | Filler Plus Foam Board 50% Filler | Balsa Wood | Structural Insulating Board | Medium Density Hardboard |
|---|---|---|---|---|
| Modulus (average) | | | | |
| Flexural (psi) | 11,000 | 420,000 (gd) | 70,000 | 500,000 |
| Compressive (psi) | 3,600 | — | 500 | 4,000 |
| Tensile (psi) | 10,000 | — | — | — |
| Strength (average) | 180 | 2,100 (gd) | — | 300 (ps) |
| Flexural (psi) at rupture | | | | 1,500 (pds) |
| Compression (psi) at yield | 150 | 1,250 (gd) 70 (pgd) | — | 4,000 (ps) |
| Tensile (psi) at failure | 90 | 110 (pgd) | 300 (ps) 20 (pds) | 2,500 (ps) 120 (pds) |
| Impact Failure (ft lb/in) | 3-4 | — | — | — |

(gd) grain direction
(pgd) perpendicular to grain direction
(ps) parallel to surface
(pds) perpendicular to surface Table 5 shows that board products have superior properties in the grain direction of the wood. This is particularly true for balsa wood. By plying thin sections of wood, the superior properties can be distributed throughout 360° of rotation in the plane of the board. Transverse to grain direction, or interlaminar shear between plies, reveals the true weakness of the wood product boards. The present invention, on the other hand, shows nearly isotropic directional properties. Moreover, these properties exceed those lower values recorded for wood and cross-grain or interlaminar ply stress fields.

Figure 2:
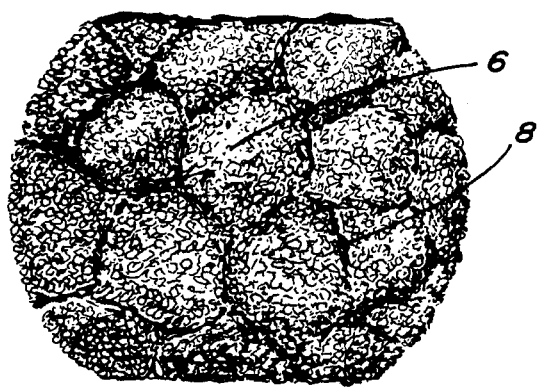
FIG. 2 is a cross-section of a first embodiment of the invention.

The superior physical properties of the present invention are perhaps best illustrated by the board's capacity to accept lamination. Such a characteristic is extremely desirable in the building industry. FIG. 1 illustrates the pre-blown, homogenous mixture of polystyrene beads 2 and lignocellulose filler 4. As best shown in FIG. 2, during heating, the beads soften and expand, thereby creating localized regions of foam microstructure 6 surrounded by the lignocellulose filler 4. Because the polymeric beads quadruple in size during expansion, the filler 4 is spread out, allowing interbead contact and adhesion. During processing, the softened polystyrene beads "wet out" the extractable organics inherent in the lignocellulose filler particles 4, thereby physically locking two or more beads together. The location of the filler particles at the interfacial boundaries between the foamed beads is believed to be what leads to the increased stability of the board. Additionally, the flakes and fibers of the filler material provide a bridging structure between the localized, foamed bead structures, while the granular filler material helps fill in the interstital voids between the polymer beads prior to expansion. (See FIG. 2).

Figure 3:
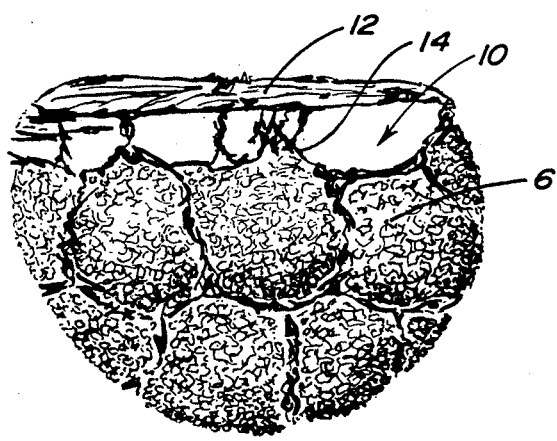
FIG. 3 is a elevational cross-section of a second embodiment of the invention with a lamination on one surface thereof.

FIG. 3 illustrates the board structure after lamination. In the prior art synthetic or composite boards, lamination with a polyester resin causes the board to simply dissolve and collapse. The free monomer present in the laminating resin subjects the board to solvent attack, thereby causing the board to dissolve and collapse. The prior board lacks the internal structural integrity to withstand such solvent attack. In the present invention, however, when a polyester resin containing a free styrene monomer is applied to the board during lamination, although the foam fractions of the board collapse and dissolve, fluid dynamics and surface tension draw the dissolving polymer out of the "cage structure" formed by the surrounding lignocellulose filler. The filler then provides the mechanical strength for structurally supporting the surface, thus preventing complete collapse of the board. Under these conditions, the foam microstructure 6 near the surface of the board forms macrovoids 10 allowing support of the laminate 12. The filler material in the present invention, additionally absorbs some of the styrene monomer, thereby reducing the depth of the instantaneous attack on the foam and limits the macrovoid formation to the board surface only. This sorbed monomer then assists the fluidity of the collapsing polymer as it is drawn back into the filler cage 14.

The present invention is not limited to lamination by polymeric resins. The macrovoid formation during lamination is also apparent when the board surface is thermally treated. Such treatment could occur for example, with hot asphalt or tar well known in the roofing industry and is known as treatment by thermal insult. The composite board product of the present invention can withstand the heat developed during application of thermal insults which normally destroy the structure of unfilled foam or conventional composite board structures.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention of the limits of the appended claims.

What I claim is:

1. A molded foam composite board, comprising:
    (a) from about 40 parts by weight to about 90 parts by weight of a thermoplastic polymer comprising vinyl monomers having a blown density of from about 1 to about 3 lb m/ft³;
    (b) from about 1 part by weight to about 60 parts by weight lignocellulosic filler providing extractable plasticizer compounds, said filler comprising from about 10 to about 25% cellulose content, from about 30 to about 45% lignin content and from about 7 to about 13% ash content so that upon being blown the surface of said polymer is plasticized by said compounds for thereby increasing interfacial bonding between the expanded polymer and said filler; and,
(c) tacifier agent of from about 1 part by weight to about 2 parts by weight of said polymer.

2. A composite board as in claim 1, wherein:
(a) said thermoplastic polymer chosen from the group consisting of polystyrene, poly (methyl methacrylate), poly (vinyl chloride), poly (vinylidine chloride) and polyacrylonitrile.

3. A composite board as in claim 1, wherein:
(a) said polymer to said filler content having a preferred ratio of 50–50 parts by weight.

4. A composite board as in claim 1, wherein:
(a) said cellulosic filler having an extractable organic content of at least 70%.

5. A composite board as in claim 1, wherein:
(a) said cellulosic filler chosen from the group consisting of cotton gin by-product waste, sawdust, shredded paper, ground corn cobs and milo stubble.

6. A composite board as in claim 5, wherein:
(a) said filler comprising flakes, fibres and granules of from about 10 to about 30 mesh size.

7. A composite board as in claim 6, wherein:
(a) said filler having a total content of about 80 parts by weight 16 mesh size and about 20 parts by weight 30 mesh size.

8. A composite board as in claim 1, wherein:
(a) said tacifier agent having a sufficiently low viscosity so as to promote adherence of said filler and said polymer during blending and to promote adhesive bonding during molding.

9. A composite board as in claim 1, wherein:
(a) said tacifier chosen from the group consisting of silane polyester and poly glycol.

10. A composite board as in claim 1, further comprising:
(a) from about 6 to about 10 parts by weight flame retardant material.

11. A composite board as in claim 10, wherein:
(a) said flame retardant material is ammonium phosphate.

12. A composite board as in claim 1, wherein:
(a) said board has a density of from about 5 lb m/ft$^3$ to about 60 lb m/ft$^3$.

13. A molded foam composite board comprising:
(a) from about 40 parts by weight to about 90 parts by weight of thermoplastic polymer comprising vinyl monomers having a blown density of from about 1 to about 3 lb m/ft$^3$;
(b) from about 1 part by weight to about 60 parts by weight lignocellulosic filler providing extractable plasticizer compounds, said filler comprising from about 10 to about 25% cellulose content, from about 30 to about 45% lignin content and from about 7 to about 13% ash content, so that upon expansion the surface of said polymer is thereby plasticized for promoting interfacial bonding between the expanded polymer and said filler;
(c) tacifier agent of from about 1 part by weight to about 2 parts by weight of said polymer; and,
(d) at least one surface of said board having a laminate applied thereto.

14. A composite board as in claim 13, wherein:
(a) said laminate is a solvent based adhesive.

15. A composite board as in claim 14, wherein:
(a) said adhesive comprising unsaturated polyesters containing a styrene monomer.

16. A composite board as in claim 13, wherein:
(a) said laminate is a thermal insult.

17. A composite board as in claim 16, wherein:
(a) said thermal insult comprising asphalt.

18. A composite board as in claim 13, wherein:
(a) said thermoplastic polymer chosen from the group consisting of polystyrene, poly (methryl methacrylate), poly (vinyl choride), poly (vinyladine chloride) and polyacrylontrile.

19. A composite board as in claim 13, wherein:
(a) said cellulosic filler chosen from the group consisting of cotton gin by-product waste, sawdust, shredded paper, ground corn cobs and milo stubble.

20. A molded foam composite board comprising:
(a) from about 40 parts by weight to about 90 parts by weight of a thermoplastic polymer comprising vinyl monomers having a blown density of from about 1 to about 3 lb m/ft$^3$;
(b) from about 30 parts by weight to about 60 parts by weight cotton gin by-product waste; and,
(c) tacifier agent of from about 1 part by weight to about 2 parts by weight of said polymer.

21. A composite board as in claim 20, wherein:
(a) said thermoplastic polymer chosen from the group consisting of polystyrene, poly (methyl methacrylate), poly (vinyl chloride), poly (vinyladine chloride) and polyacrylonitrile.

22. A composite board as in claim 20, wherein:
(a) said polymer to said filler content having a ratio of 50–50 parts by weight.

23. A composite board as in claim 20, wherein:
(a) said cotton gin by-product waste comprising flakes, fibers and granules of from about 10 to about 30 mesh size.

24. A composite board as in claim 23, wherein:
(a) said cotton gin by-product waste having a total content of about 80 parts by weight 16 mesh size and about 20 parts by weight 30 mesh size.

25. A composite board as in claim 20, wherein:
(a) said tacifier agent having a sufficiently low viscosity so as to promote adherence of said cotton gin by-product waste and said polymer during blending and to promote adhesive bonding during molding.

26. A composite board as in claim 20, wherein:
(a) said tacifier chosen from the group consisting of silane polyester and poly glycol.

27. A composite board as in claim 20, further comprising:
(a) from about 6 to about 10 parts by weight flame retardant material.

28. A composite board as in claim 27, wherein:
(a) said flame retardant material is ammonium phosphate.

* * * * *